United States Patent
Ko et al.

(10) Patent No.: US 11,714,804 B2
(45) Date of Patent: Aug. 1, 2023

(54) METHOD AND APPARATUS FOR MANAGING LINK RELATED TO KEYWORD ADVERTISEMENT

(71) Applicant: Coupang Corp., Seoul (KR)

(72) Inventors: Hun Min Ko, Seoul (KR); Seung Yong Baek, Seoul (KR); Binna Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/382,551

(22) Filed: Jul. 22, 2021

(65) Prior Publication Data

US 2022/0327110 A1    Oct. 13, 2022

(30) Foreign Application Priority Data

Apr. 9, 2021   (KR) .................. 10-2021-0046373

(51) Int. Cl.
*G06F 16/00*     (2019.01)
*G06F 16/23*     (2019.01)
*G06F 16/248*    (2019.01)
*G06Q 30/0601*   (2023.01)

(52) U.S. Cl.
CPC ........ *G06F 16/2379* (2019.01); *G06F 16/248* (2019.01); *G06Q 30/0641* (2013.01)

(58) Field of Classification Search
CPC .. G06F 16/2379; G06F 16/248; G06F 16/958; G06Q 30/0641
USPC ...................................................... 707/703
See application file for complete search history.

(56) References Cited

U.S. PATENT DOCUMENTS

| 10,789,315 | B1* | 9/2020 | Zoller ............... G06F 16/9535 |
| 2008/0235565 | A1* | 9/2008 | Ackerman ........... G06F 40/103 715/205 |
| 2010/0083124 | A1 | 4/2010 | Druzgalski et al. |
| 2013/0325919 | A1 | 12/2013 | Carter et al. |
| 2015/0033114 | A1 | 1/2015 | Lynch et al. |
| 2015/0331947 | A1* | 11/2015 | Elgebeely .............. G06F 16/27 707/709 |

FOREIGN PATENT DOCUMENTS

| JP | 2001337973 A | 12/2001 |
| JP | 2008287622 A | 11/2008 |
| JP | 2010026624 A | 2/2010 |
| JP | 2011-204184 A | 10/2011 |
| JP | 6844071 B2 | 3/2021 |
| KR | 1020020030641 A | 4/2002 |
| KR | 1020030078813 A | 10/2003 |
| KR | 1020040096305 A | 11/2004 |
| KR | 101824924 B1 | 2/2018 |

* cited by examiner

*Primary Examiner* — Vincent F Boccio
(74) *Attorney, Agent, or Firm* — Banner & Witcoff, Ltd.

(57) ABSTRACT

Provided is a method of managing a keyword in a service server for providing a service, the method including acquiring a first set of keywords corresponding to a first server, checking whether each keyword in the first set of keywords corresponds to a dead link based on a landing page of the service corresponding to each keyword in the first set of keywords, updating status information of each keyword in the first set of keywords when each keyword in the first set of keywords corresponds to the dead link, and providing the updated status information of the first set of keywords to the first server.

14 Claims, 6 Drawing Sheets

METHOD AND APPARATUS FOR MANAGING LINK RELATED TO KEYWORD ADVERTISEMENT

The present application claims priority to and the benefit of Korean Patent Application No. 10-2021-0046373 filed on Apr. 9, 2021, and is incorporated by reference herein in its entirety.

TECHNICAL FIELD

The present disclosure relates to a method of managing a link used for a keyword advertisement and an apparatus using the same. Specifically, the present disclosure relates to a method of managing a keyword corresponding to a dead link and updating link-related information corresponding to the keyword upon providing a keyword advertisement and an apparatus using the same, and more particularly, to a method and apparatus capable of managing keywords by checking whether each keyword in a keyword set corresponds to a dead link based on landing pages of services corresponding to each keyword in the keyword set.

DESCRIPTION OF THE RELATED ART

As the use of the Internet becomes more popular, the e-commerce market is expanding. In particular, with the spread of infectious diseases, the proportion of purchasing items by visiting offline stores is decreasing, while the proportion of purchasing products through e-commerce transactions using computers or smartphones is rapidly increasing. Advertisements are carried out in a manner that e-commerce companies provide keyword sets to search portals, and when users search for keywords on the search portals, links of e-commerce sites corresponding to the keywords are exposed as results to direct the users to the e-commerce sites.

Meanwhile, during continuous generation and destruction of pages for products on e-commerce sites, there are many cases in which uniform resource locators (URLs) for the existing product pages no longer exist or products corresponding to keywords are not exposed, which is called a so-called dead link or broken link. Entry of users into such dead links through search portals may give a bad impression of e-commerce companies in terms of user experience and lead to user dissatisfaction with services provided by e-commerce companies. Therefore, e-commerce companies need to take measures not to expose dead links, which are present on e-commerce sites, in search results of search portals providing advertisements, and specially manage keywords capable of displaying the dead links as search results.

A dead link check for keyword sets provided for advertisements in search portals may be performed at regular periods. Since a keyword set may include tens of millions of keywords, the dead link check for the keyword set may take a considerable amount of time, and performing the dead link check too frequently may also be a waste of money. When there are a plurality of search portals where e-commerce companies advertise, there may be a plurality of keyword sets provided to the search portals, and it may be inefficient to perform a dead link check on each of the plurality of search keyword sets in which a plurality of redundant keywords are present.

Korean Patent Laid-Open Publication No. 2002-0030641 is a disclosure related to a homepage maintenance system and method and discloses a dead link check module for checking a dead link among links on the homepage and discloses a configuration that operates to check a dead link when errors occur while receiving Hypertext Markup Language (HTML) page data. However, there is not disclosed a method of identifying and separately managing keywords corresponding to dead links, and efficiently checking dead links on a plurality of keyword sets.

DISCLOSURE OF THE INVENTION

An aspect is to check whether each keyword in a first set of keywords corresponds to dead links based on landing pages of services corresponding to each keyword in the first set of keywords and update status information of each keyword. Another aspect is to efficiently perform a dead link check on a plurality of keyword sets by updating status information of keywords in a second set of keywords based on the updated status information of the first set of keywords.

According to an aspect, there is provided a method of managing a keyword in a service server for providing a service, which includes acquiring a first set of keywords corresponding to a first server, checking whether each keyword in the first set of keywords corresponds to a dead link based on a landing page of the service corresponding to each keyword in the first set of keywords, updating status information of each keyword in the first set of keywords when each keyword in the first set of keywords corresponds to the dead link, and providing the updated status information of the first set of keywords to the first server.

The method may further include acquiring a second set of keywords corresponding to a second server, updating status information of the keyword in the second set of keywords corresponding to the keywords in the first set of keywords whose status information has been updated based on the updated status information of the first set of keywords; and providing the updated status information of the second set of keywords to the second server.

An output of a result related to the service may be omitted from a search result related to the keyword corresponding to the updated status information related to the first server according to the updated status information provided to the first server.

The method may further include, when a page type corresponding to a specific keyword in the first set of keywords is a page that displays a search result provided by the service, providing the page displaying the search result of the service related to the specific keyword to a user entering the service through a link corresponding to the specific keyword on a page provided by the first server.

The method may further include, when a page type corresponding to a specific keyword in the first set of keywords is a page that displays a search result provided by the service, providing the page displaying the search result of the service related to a related keyword corresponding to the specific keyword to a user entering the service from the first server through a link corresponding to the specific keyword.

The method may further include checking whether each keyword in a first subset of keywords corresponds to the dead link based on a landing page of the service corresponding to each keyword in the first subset of keywords whose status information is not updated among the keywords in the second set of keywords, updating the status information of each keyword in the first subset of keywords when each keyword in the first subset of keywords corresponds to the dead link, and providing the updated state information of the first subset of keywords to the second server.

The checking of whether each keyword in the first set of keywords corresponds to the dead link may include checking whether a keyword selected from the first set of keywords corresponds to the dead link based on a search record of other users acquired from the service.

The checking of whether each keyword in the first set of keywords corresponds to the dead link may include checking whether a keyword selected from the first set of keywords corresponds to the dead link based on page information provided to other users entering the service from a search result of the first server.

The updating of the status information of the keyword in the second set of keywords may include, when there exists the keyword in the first set of keywords corresponding to the keyword in the second set of keywords and the landing page of the service corresponding to the keyword in the second set of keywords corresponds to the landing page of the service corresponding to the keyword in the first set of keywords, updating the status information of the keyword in the second set of keywords on the basis of the status information of the keywords in the first set of keywords.

The landing page may include one of a page displaying a search result of the service server and a page displaying detailed information of a product selected from the search result, and the method of managing a keyword may further include, when a first keyword in the first set of keywords corresponds to the dead link and the landing page of the service corresponding to the first keyword is the page displaying the search result, updating status information of the first keyword and a second keyword which is related to the page displaying the detailed information of the product included in the search result.

The method may further include, when the first keyword in the first set of keywords corresponds to the dead link and the landing page of the service corresponding to the first keyword is the page displaying the search result, updating the landing page of the service corresponding to the first keyword to a landing page related to a replacement keyword of the first keyword.

The checking of whether each keyword in the first set of keywords corresponds to the dead link may further include assigning a priority to a keyword satisfying a specific condition in the search record, and a cycle of checking whether the keyword to which the priority is assigned corresponds to the dead link may be shorter than a cycle of checking whether the keyword to which the priority is not assigned corresponds to the dead link.

The specific condition may include a condition that a search frequency for the keyword in the search record is greater than or equal to a threshold value for a predetermined period of time.

The method may further include adding a keyword to the first set of keywords based on the search record.

According to another aspect, there is provided a service server for providing a service, which includes a transceiver configured to transmit and receive information to and from another apparatus and a processor configured to control the transceiver, acquire a first set of keywords corresponding to a first server, check whether each keyword in the first set of keywords corresponds to a dead link based on a landing page of the service corresponding to each keyword in the first set of keywords, update status information of each keyword in the first set of keywords when each keyword in the first set of keywords corresponds to the dead link, and provide the updated status information of the first set of keywords to the first server.

According to still another aspect, there is provided a non-transitory computer-readable storage medium including a medium configured to store computer-readable instructions, in which when the computer-readable instructions are executed by a processor, the processor performs a method of managing a keyword in a service server providing a service, the method including acquiring a first set of keywords corresponding to a first server, checking whether each keyword in the first set of keywords corresponds to a dead link based on a landing page of the service corresponding to each keyword in the first set of keywords, updating state information of each keyword in the first set of keywords when each keyword in the first set of keywords corresponds to the dead link, and providing the updated status information of the first set of keywords to the first server.

According to example embodiments, it is possible to enhance user experience by checking whether each keyword in a keyword set corresponds to a dead link related to each keyword in the keyword set based on a landing page of an e-commerce server corresponding to each keyword in the keyword set provided to a search portal for an advertisement, updating status information of each keyword and providing the updated status information to the search portal when each keyword corresponds to the dead link so that the dead link related to the e-commerce site is not exposed in search results of the search portal, and separately managing the keyword corresponding to the dead link.

In addition, according to example embodiments, it is possible to update a status of a keyword corresponding to a dead link efficiently and at low cost without repeatedly performing a dead link check on different keyword sets by updating a status related to the dead link of keywords in a second set of keywords corresponding to another server based on the result of performing the dead link check on all keywords in a first set of keywords corresponding to one server in order to manage keyword sets corresponding to each of a plurality of servers in which keyword advertisements are provided.

In addition, according to example embodiments, it is possible to completely identify a keyword corresponding to a dead link while maintaining efficiency by performing a dead link check only on a first subset of keywords whose status information is not updated based on a first set of keywords among the keywords in a second set of keywords.

In addition, according to example embodiments, by assigning a priority for dead link check to each keyword based on search histories of other users, it is possible to reduce the likelihood that a user enters a page corresponding to a dead link by shortening a check cycle for frequent search keywords and promote a more efficient check by lengthening a check cycle for infrequent search keywords.

DETAILED DESCRIPTION OF THE INVENTION

Hereinafter, example embodiments of the present disclosure will be described with reference to the accompanying drawings.

In describing the example embodiments, descriptions of technical contents that are well known in the technical field to which the present disclosure pertains and are not directly related to the present disclosure will be omitted. This is to more clearly convey the gist of the present disclosure without ambiguity by omitting unnecessary descriptions.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods accomplishing them will become apparent from example embodiments to be described in detail below with reference to the accompanying drawings. However, the present disclosure is not limited to example embodiments to be described below but may be implemented in various different forms, and these example embodiments will be provided only in order to make the present disclosure complete and allow those skilled in the art to completely recognize the scope of the present disclosure, and the present disclosure will be defined by the scope of the claims. Throughout the specification, like reference numerals denote like elements.

In this case, it will be appreciated that each block of a processing flowchart and combinations of the flowcharts may be executed by computer program instructions. Since these computer program instructions may be installed in a processor of a general computer, a special computer, or other programmable data processing apparatuses, these computer program instructions executed through the process of the computer or the other programmable data processing apparatuses create a unit for performing functions described in a block(s) of the flowchart. Since these computer program instructions may also be stored in a computer usable or computer readable memory of a computer or other programmable data processing apparatuses in order to implement the functions in a particular way, the computer program instructions stored in the computer usable or computer readable memory may also produce manufacturing articles including an instruction unit for performing the functions described in a block(s) of the flowchart. Since the computer program instructions may also be installed in the computer or the other programmable data processing apparatuses, the instructions perform a series of operation steps on the computer or the other programmable data processing apparatuses to create processes executed by the computer to run the computer or the other programmable data processing apparatuses, it may be possible to provide steps for performing the functions described in a block(s) of the flowchart.

In addition, each block may indicate some of modules, segments, or code including one or more executable instructions for executing a specific logical function (specific logical functions). Further, it is to be noted that functions mentioned in the blocks occur regardless of a sequence in some alternative example embodiments. For example, two blocks that are continuously shown may in fact be simultaneously performed or be performed in a reverse sequence depending on corresponding functions.

In this case, the term "unit" used in this example embodiment may refer to software or hardware components such as a field programmable gate array (FPGA) or an application specific integrated circuit (ASIC), and the "unit" performs certain roles. However, "unit" is not limited to the software or the hardware. The "unit" may be configured to be in an addressable storage medium or may be configured to reproduce one or more processors. Therefore, as an example, the "unit" includes components such as software components, object-oriented software components, class components and task components, processes, functions, attributes, procedures, subroutines, segments of program code, drivers, firmware, microcode, circuit, data, a database, data structures, tables, arrays, and variables. Components and functions provided within "units" may be combined into a smaller number of components and "units" or be further separated into additional components and "units." Furthermore, components and "units" may be implemented to reproduce one or more central processing units (CPUs) in a device or a security multimedia card.

Figure 1:
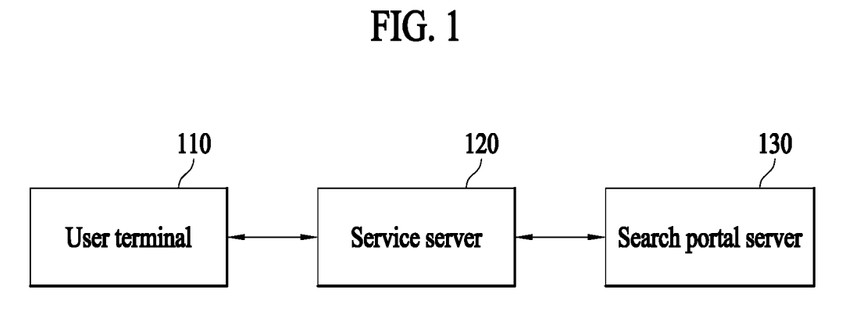
FIG. 1 is a diagram schematically illustrating a configuration of a system for managing a link related to a keyword advertisement according to an example embodiment of the present disclosure.

FIG. 1 is a diagram schematically illustrating a configuration of a system for managing a keyword corresponding to a dead link according to an example embodiment of the present disclosure.

Referring to FIG. 1, the system for managing a keyword according to the example embodiment of the present disclosure may include a user terminal 110, a service server 120, and a search portal server 130.

An e-commerce user may access the service server 120 using the user terminal 110. The user terminal 110 has an e-commerce application installed therein and may access the service server 120 under the control of the application and use e-commerce based on information exchanges with the service server 120. The user terminal 110 may be a mobile device such as a smartphone and a tablet personal computer (PC) or a static device such as a desktop PC, and any device in which an e-commerce application may be installed and executed may be used as the user terminal 110 without limitation.

The service server 120 may communicate with the user terminal 110 and provide information related to e-commerce to the user terminal 110. In addition, the service server 120 may communicate with the search portal server 130 and may receive information related to a search portal or information on a keyword set provided for an advertisement.

The search portal server 130 may be operated by a search portal administrator, manage the search portal, and receive a keyword set for an advertisement and a link for a page indicating a search result of the service server corresponding to a keyword from the service server 120. The e-commerce user may access the search portal server 130 using the user terminal 110 and request a query for a page from the service server 120 by clicking a link connected to the service server 120 exposed in the search portal server 130.

Figure 2:
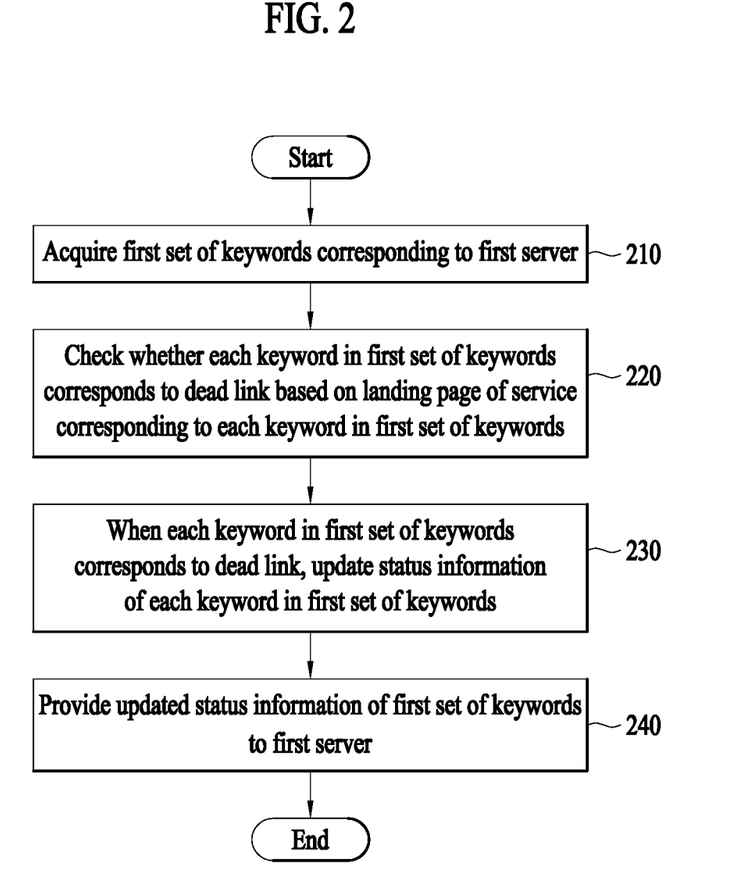
FIG. 2 is a flowchart of a flow of a method of managing a link related to a keyword advertisement in a service server for providing a service according to an exemplary embodiment of the present disclosure.

FIG. 2 is a flowchart illustrating a flow of a method of managing a keyword corresponding to a dead link in a service server for providing a service according to an example embodiment of the present disclosure.

In operation 210, the service server may acquire a first set of keywords corresponding to a first server. The service server may be a server that provides sales information of products of various companies as search results and provides an online shopping service that sells products online. The first server may be a server that serves a search engine or a search portal for searching for information and websites present on the web. The first set of keywords may be a set of one or more keywords provided to the first server by the service server for an advertisement, and when the keyword included in the first set of keywords is searched for by the first server, the first server may provide a user with a link connected to a search page for a corresponding keyword of the service server as a search result. The service server may provide the first set of keywords to the first server for an advertisement and update the first set of keywords whenever a keyword for an advertisement changes and provide the updated first set of keywords to the first server.

In operation 220, the service server may check whether each keyword in the first set of keywords corresponds to a dead link based on a landing page of a service corresponding to each keyword in the first set of keywords.

The landing page is a web page that a user who accesses through a search engine, an advertisement, or the like first sees, and by clicking a link provided by the first server for an advertisement of a product corresponding to a specific keyword, a user may enter the landing page of the service server corresponding to the specific keyword and may be encouraged to perform an action that an advertiser intends. For example, when a user searches for a product "diaper" in the first server, a link such as a uniform resource locator (URL) connected to a search page that searches for "diaper" in the service server is displayed as the search result of the first server, and the user may enter the search page for "diaper" of the service server by clicking the link, check product sales information on various kinds of "diapers" provided by the service server, and purchase the desired "diaper" product. In this way, the service server exposes a link connected to a search result of a service server of an own company in the search result of the first server such as the search portal, and thus the user may enter the landing page of the service server to be encouraged to purchase products on an online shopping site provided by the service server.

The link connected to the landing page may include a landing page type and information on a landing keyword. The landing page type may indicate a landing page type provided by the service server, and the landing page may include various types of pages that include a search result page displaying a search result of a product, a product detail page displaying detailed information of a specific product selected from the search result, a shopping cart page on which products that the user has selected for purchase are listed, and the like.

The landing keyword may be a keyword input to obtain a search result from the service server when the landing page type provided by the service server is a search result page. In some example embodiments, the landing keyword may match a keyword included in the keyword set provided to the first server by the service server. For example, when a user searches for keyword "Company A large diaper" in the first server and enters the landing page provided by the service server, the landing page may be a search result page in which the service server searches for landing keyword "Company A large diaper" that matches the keyword "Company A large diaper" provided to the first server. In other example embodiments, the landing keyword may not match the keyword included in the keyword set provided to the first server by the service server. For example, when the user searches for keyword "Company A large diaper" in the first server and enters the landing page provided by the service server, the landing page may be a search result page in which the service server searches for landing keyword "Company A diaper" or "large diaper Company A" that is different from the keyword "Company A large diaper" provided by the first server.

In some example embodiments, when a landing page type corresponding to a specific keyword in the first set of keywords is a page displaying a search result provided from the service, the service server may provide a page displaying a search result of a service related to the specific keyword to a user who enters a service through a link corresponding to the specific keyword from the first server. That is, when the landing keyword matches the keyword included in the first set of keywords corresponding to the first server, the user may enter the page displaying the search result of the service for the specific keyword in the first set of keywords through the link.

In some other example embodiments, when the landing page type corresponding to the specific keyword in the first set of keywords is the page displaying the search result provided from the service, the service server may provide a page displaying a search result of a service related to a related keyword corresponding to the specific keyword to a user who enters a service through the link corresponding to the specific keyword from the first server. That is, when the landing keyword does not match the keyword included in the first set of keywords corresponding to the first server, the user may enter the page displaying the search result of the service for the corresponding related keyword (for example, landing keyword) that is different from the specific keyword in the first set of keywords through the link.

The dead link may refer to a link on the web that indicates a web page or a server that is not permanently available. In some example embodiments, when the landing page type provided by the service server is the search result page, the dead link may correspond to a page indicating that the output number of search results for the landing keyword by the service server is zero. In some example embodiments, when the landing page type provided by the service server is the product detail page, the dead link may correspond to a product detail page for a product which no longer exists. Entry of a user into the page of the service server through such a dead link may adversely affect user experience and lead to user dissatisfaction with the service provided by the service server. Therefore, the service server needs to take measures not to expose the dead link of the service server in the search result of the first server that provides the advertisement and needs to specially manage the keywords in the first set of keywords provided to the first server that may display the link to the landing page corresponding to the dead link as a search result.

In some example embodiments, the service server may check whether the keyword selected from the first set of keywords corresponds to the dead link based on a search record of other users acquired from the service. Entry of other users who use the search service of the service server into the page corresponding to the dead link through a search for a specific keyword may be identified by the service server, and the service server may store the identification as a search record. The service server may identify a landing page or a landing keyword corresponding to a dead link through such a search record of other users and check whether the keyword selected from the first set of keywords exposes a link to the landing page corresponding to the dead link in the first server as a search result. In this way, by using the search record of other users for a dead link check, it is possible to reduce the likelihood that a user enters the page corresponding to the dead link.

In some example embodiments, the service server may check whether the keyword selected from the first keyword corresponds to the dead link based on page information provided to other users entering the service from the search result of the first server. The service server may identify that other users who use the search service of the first server enters a page corresponding to the dead link of the service server through a search for a specific keyword. When there exist other users who enter the page corresponding to the dead link of the service server through the link exposed as the search result of the first server, the service server may check the keywords in the first set of keywords corresponding to the dead link in the page information corresponding to the dead link. In this way, the service server may check whether the keyword selected from the first keyword corresponds to the dead link based on the page information provided to other users entering the service from the search result of the first server, thereby reducing the likelihood that the user enters the page corresponding to the dead link.

In some example embodiments, the service server may assign a priority to a keyword that satisfies a specific condition in the search record of other users acquired from the service, and a cycle of checking whether a keyword to which the priority is assigned corresponds to a dead link may be shorter than a cycle of checking whether a keyword to which the priority is not assigned corresponds to the dead link. The service server may identify frequent search keywords (for example, a keyword in which a search frequency of a keyword in the search record is greater than or equal to a threshold value for a certain period of time) among other keywords through the search record of the user and may set a dead link check period for the frequent search keywords to be shorter than a dead link check period for infrequent search keywords. The dead link check for the keyword set may be performed at a certain cycle (for example, once a day), and as a keyword is more frequently searched for in the service server, there is a high risk that a user enters the page corresponding to the dead link of the service server through the keyword. In addition, the dead link check cycle for the infrequent search keyword may be lengthened, thereby achieving a more efficient check.

In some example embodiments, the service server may add a keyword to the first set of keywords based on the search record of other users acquired from the service. The service server may identify frequently search keywords among other keywords through the search record of the user, and when the frequent search keywords are not included in the first set of keywords, may perform an update of adding the frequent search keywords to the first set of keywords and then provide the updated frequent search keywords to the first server. The service server may increase the advertising effect by adding the frequent search keyword to the first set of keywords corresponding to the first server.

In operation 230, when each keyword in the first set of keywords corresponds to the dead link, the service server may update status information of each keyword in the first set of keywords.

The keywords in the first set of keywords may have status information of either "on" or "off". The service server may expose a link to a landing page corresponding to the keyword in the search result of the keyword by the first server by setting the status information of the keyword included in the first set of keywords provided to the first server to "on". Meanwhile, when a link on a landing page corresponding to a specific keyword is a dead link, the link to the landing page corresponding to the specific keyword may not be exposed in the search result of the specific keyword by the first server by setting the status information of the specific keyword to "off" to prevent a user from entering the page of the service server through the dead link. That is, the first server may expose the link connected to the page of the service server only in the search result of the keyword whose status information is "on" in the first set of keywords provided from the service server and may not expose the link connected to the page of the service server in the search result of the keyword whose status information is "off". The service server may check whether the landing page of the service corresponding to each keyword in the first set of keywords corresponds to the dead link and perform the update by setting the status information of each keyword in the first set of keywords corresponding to the landing page identified as the dead link to "off".

In some example embodiments, the landing page may include one of a page displaying the search result of the service server and a page displaying detailed information of a product selected from the search result, and the service server may update status information of a first keyword and a second keyword that is related to a page displaying the detailed information of the product included in the search result when the first keyword in the first set of keywords corresponds to the dead link and the landing page of the service corresponding to the first keyword is the page displaying the search result. When the landing page of the service corresponding to the first keyword is the page displaying the search result, and the number of search results of the landing keyword of the service server corresponding to the first keyword is zero, the first keyword may correspond to the dead link. In addition, when the number of search results is zero, since there is no product included in the search result, the second keyword related to the page displaying the detailed information of the product included in the search result may also correspond to the dead link. For example, when the number of search results of the service server of the first keyword "large diaper" is zero, since there is no page for the second keyword "Company A large diaper" and "Company B large diaper" related to the page displaying the detailed information of the product included in the search result, both the first keyword and the second keyword may correspond to the dead link. In this case, when it is checked that the first keyword corresponds to the dead link, since the status information of the first keyword and the second keyword may be changed to "off" without performing the dead link check on the second keyword, it is possible to efficiently perform the dead link check and the update.

In some example embodiments, when the first keywords in the first set of keywords corresponds to the dead link, and the landing page of the service corresponding to the first keyword is the page displaying the search result, the service server may update the landing page of the service corresponding to the first keyword to a landing page related to a replacement keyword of the first keyword. When the landing page of the service corresponding to the first keyword is the page displaying the search result, and the number of search results of the landing keyword of the service server corresponding to the first keyword is zero, the first keyword may correspond to the dead link. In this case, the service server may update the landing page of the service corresponding to the first keyword to the landing page related to the replacement keyword of the first keyword capable of providing information, and the replacement keyword of the first keyword may be a keyword of an umbrella concept of the first keyword. For example, when the number of search results of the service server for the first keyword "Company A large diaper" is zero, the service server may redirect the landing page of the service corresponding to the first keyword "Company A large diaper" to a higher-level search result page capable of providing information by updating the landing page of the service corresponding to the first keyword "Company A large diaper" to a landing page related to "Company A diaper" or "large diaper," which is a keyword of an umbrella concept than the "Company A large diaper", as the replacement keyword of the first keyword.

In operation 240, the service server may provide the updated status information of the first set of keywords to the first server. The output of the result related to the service may be omitted from a search result related to a keyword corresponding to the updated status information related to the first server according to the updated status information of the first set of keywords provided to the first server. That is, the service server may update the status information of the first set of keywords corresponding to the dead link and provide the updated status information to the first server, thereby preventing the link to the landing page corresponding to the dead link from being exposed in the first server.

Figure 3:
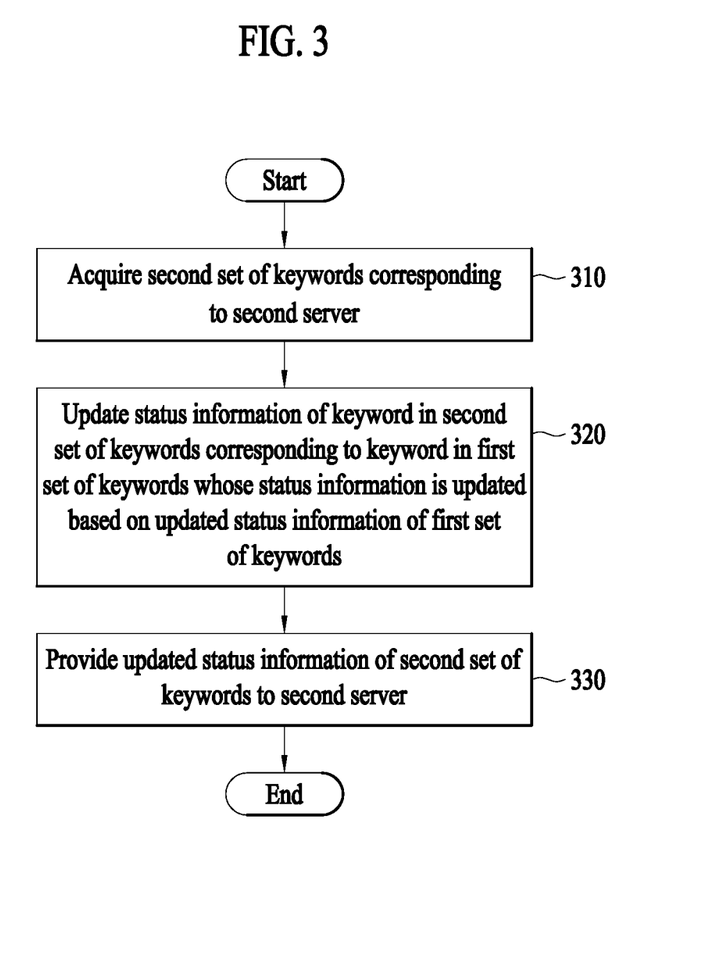
FIG. 3 is a flowchart of a flow of a method of updating status information of a second set of keywords provided to a second server according to an example embodiment of the present disclosure.

FIG. 3 is a flowchart illustrating a flow of a method of updating status information of a second set of keywords provided to a second server according to an example embodiment of the present disclosure.

In operation 310, the service server may acquire a second set of keywords corresponding to a second server. Like the first server, the second server may be a server that serves a search engine or a search portal for searching for information and websites that are present on the web. The second set of keywords may be a set of one or more keywords provided to the second server by the service server for an advertisement, and when the keyword included in the second set of keywords is searched for by the second server, the second server may provide a user with a link connected to a search page for a corresponding keyword of the service server as a search result. The service server may provide the second set of keywords to the second server for an advertisement and update the second set of keywords whenever a keyword for an advertisement changes and provide the updated second set of keywords to the second server.

In some example embodiments, the second set of keywords may be the same keyword set as the first set of keywords. In another example embodiment, the second set of keywords may be a keyword set different from the first set of keywords. For example, the keywords in the first set of keywords for exposing a link to a landing page showing a search result of landing keyword "Company A diaper infants" in the service server is "Company A diaper infants", while the keywords in the second set of keywords for exposing the same link in the search result of the second server may include "Company A infants diaper", "Company A small diaper", or the like.

In operation 320, the service server may update the status information of the keywords in the second set of keywords corresponding to the keyword in the first set of keywords whose status information has been updated based on the updated status information of the first set of keywords. The fact that the keywords in the first set of keywords correspond to the keywords in the second set of keywords may include that the landing page of the service server to which the link exposed as the search result of the keywords in the first set of keywords by the first server is connected corresponds to the landing page of the service server to which the link exposed as the search result of the keywords in the second set of keywords by the second server is connected. The fact that the pages correspond to each other may include that URLs connected to a page are the same or that queries requested from the server to call a page are the same.

In some example embodiments, when there are the keywords in the first set of keywords corresponding to the keywords in the second set of keywords and the landing page of the service corresponding to the keywords in the second set of keywords corresponds to the landing page of the service corresponding to the keywords in the first set of keywords, the status information of the keywords in the second set of keywords may be updated based on the status information of the keywords in the first set of keywords. That is, when the specific keyword in the second set of keywords corresponding to the second server is present in the first set of keywords corresponding to the first server, and landing pages of services corresponding to the specific keyword in the second set of keywords and the specific keyword in the first set of keywords, respectively, correspond to each other, the status information of the specific keyword in the second set of keywords may be changed based on the status information of the specific keyword in the first set of keywords.

Like the updated status information of the first set of keywords in operation 230 described above, the service server may update the status information of the keywords in the second set of keywords corresponding to the keywords in the first set of keywords whose status information has been updated. For example, since the keyword "Company A diaper infants" of the first set of keywords corresponds to a dead link, when the status information of "Company A diaper infants" is updated to "off", the status information of the keyword "Company A infants diaper" and "Company A small diaper" of the second set of keywords corresponding to the keyword "Company A diaper infants" of the first set of keywords may be updated to "off" in the same manner. In this way, by updating the status related to the dead link of keywords of the keyword set corresponding to other servers based on the result of performing the dead link check on all the keywords of the keyword set, it is possible to update the status of the keyword corresponding to the dead link efficiently and at low cost without repeatedly performing the dead link check on other keyword sets.

In some example embodiments, the service server may check whether each keyword in a first subset of keywords corresponds to the dead link based on the landing page of the service corresponding to each keyword in the first subset of keywords for the first subset of keywords whose status information has not been updated among the keywords of the second set of keywords, update the status information of the keywords in the first subset of keywords when each keyword in the first subset of keywords corresponds to the dead link, and provide the updated status information of the first subset of keywords to the second server. Since there may be keywords that do not correspond to the keywords of the first set of keywords among the keywords of the second set of keywords and the keywords may not be updated based on the updated status information of the first set of keywords, the service server may perform the dead link check on a subset of keywords whose status information in the second set of keywords has not been updated. The service server may completely identify the dead link and the corresponding keyword while maintaining efficiency by performing the dead link check on only a subset that is smaller than that of the second set of keywords.

In operation 330, the service server may provide the updated status information of the second set of keywords to the second server. The service server may update the status information of the second set of keywords corresponding to the dead link and provide the updated status information to the second server, thereby preventing the link to the landing page corresponding to the dead link from being exposed in the second server.

Figure 4:
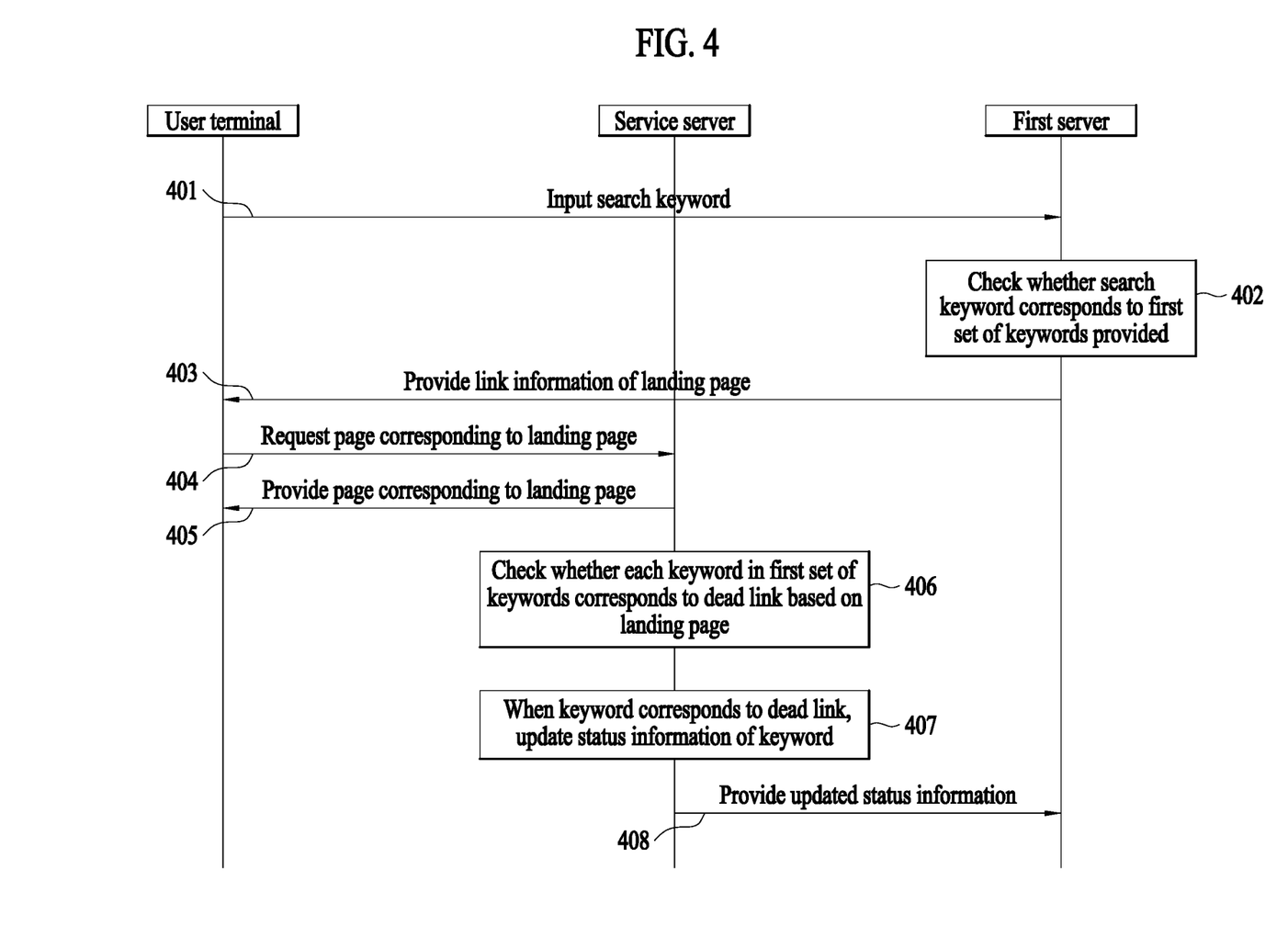
FIG. 4 is a sequence diagram illustrating information exchanges and operations corresponding to the information exchanges between respective nodes related to a method of providing a page and a method of updating status information of a keyword according to an example embodiment of the present disclosure.

FIG. 4 is a sequence diagram illustrating information exchanges and operations corresponding to the information exchanges between respective nodes related to a method of providing a page and a method of updating status information of a keyword according to an example embodiment of the present disclosure.

Referring to FIG. 4, a method of exchanging information between a user terminal, a service server, and a first server and an operation method at each node according to the example embodiment of the present disclosure are disclosed.

In operation 401, the user terminal may input a search keyword on a page of the first server to search for information on the keyword and transmit the input search keyword to the first server.

In operation 402, the first server may check whether the input search keyword corresponds to a first set of keywords provided from the service server. The service server may provide a set of keywords for a keyword advertisement to the first server for providing a search portal for an advertisement of a service, and the first server may check whether a search keyword received from the user terminal is included in the first set of keywords.

In operation 403, when it is determined that the search keyword corresponds to the keyword in the first set of keywords, the first server may provide link information of the landing page corresponding to the keyword to the user terminal. The link information may include URL information including information on a landing page type and a landing keyword related to the landing page. For example, when the user terminal searches for "Company A diaper infants" as the search keyword, and the first set of keywords includes the search keyword, the first server may provide the user terminal with the link information of the landing page corresponding to the search keyword, and the landing page may include a search result page for "Company A diaper infants" by the service server, a page displaying detailed information on product "Company A diaper infants", and a shopping cart page containing product "Company A diaper infants". As described above, the landing keyword may match or may not match the search keyword. For example, when the search keyword is the "Company A diaper infants", the landing page may not match the search keyword, but may be a page displaying a search result of related keyword "Company A small diaper" as the landing keyword.

In operation 404, the user terminal may request a page corresponding to the landing page from the service server. The link information of the landing page provided by the first server may be displayed on the user terminal as the search result of the search keyword, and the user may transmit a request for the page corresponding to the landing page to the service server by clicking the link information.

In operation 405, the service server may provide the page corresponding to the landing page to the user terminal, and the user may enter the landing page.

Operations 406 to 408 relate to a method of managing, by the service server, a keyword corresponding to a dead link among the keywords included in the first set of keywords. In operation 406, the service server may check whether each keyword in the first set of keywords corresponds to a dead link based on a landing page of a service corresponding to each keyword in the first set of keywords. In operation 407, when each keyword in the first set of keywords corresponds to the dead link, the service server may update status information of each keyword in the first set of keywords. In operation 408, the service server may provide the updated status information of the first set of keywords to the first server. Operations 406 to 408 correspond to operations 220 to 240, respectively, and detailed descriptions thereof may be omitted. Meanwhile, in FIG. 4, operations 406 to 408 are shown to be performed after operation 405 is performed, but this is only exemplary, and operations 406 to 408 may be performed regardless of an operation of the user terminal inputting a search keyword and requesting a page, and may be performed at a predetermined cycle or may be performed by an update request.

Figure 5:
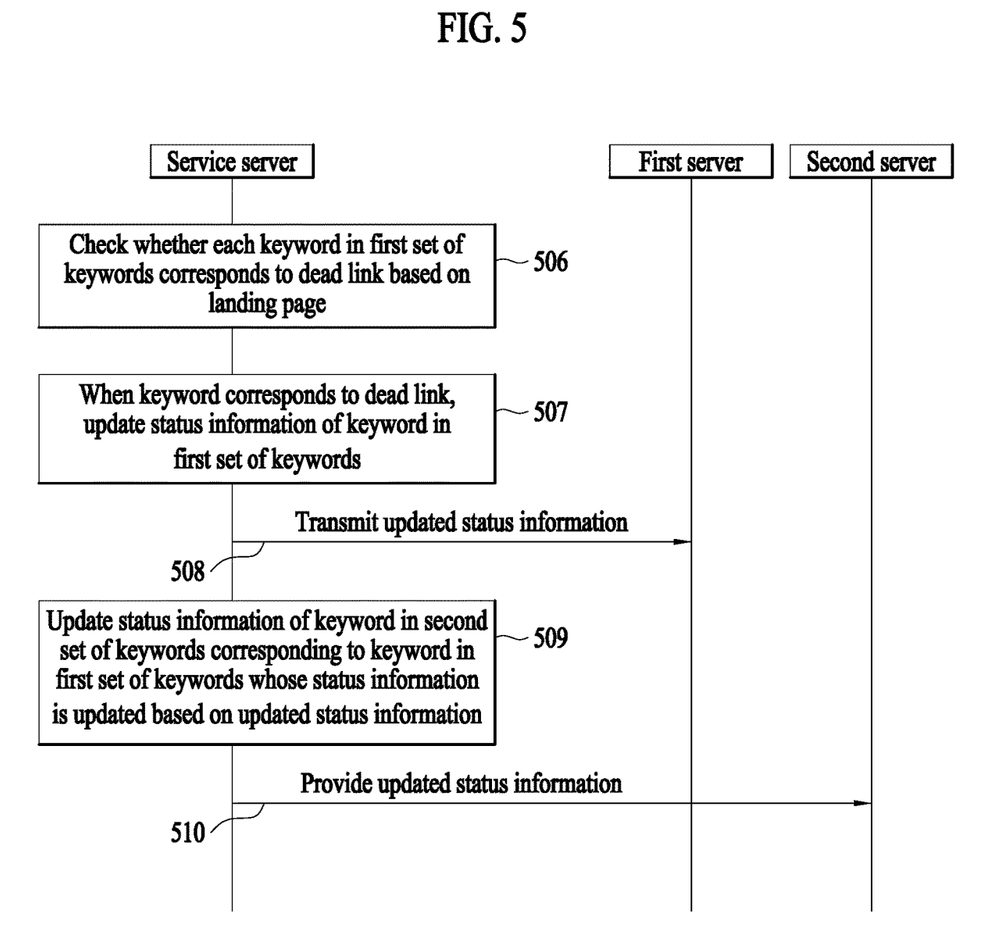
FIG. 5 is a sequence diagram illustrating information exchanges and operations corresponding to the information exchanges between respective nodes related to a method of updating status information of keywords of a plurality of servers according to an example embodiment of the present disclosure.

FIG. 5 is a sequence diagram illustrating information exchanges and operations corresponding to the information exchanges between respective nodes related to a method of updating status information of keywords of a plurality of servers according to an example embodiment of the present disclosure.

Referring to FIG. 5, a method of exchanging information between a service server, a first server, and a second server, and an operation method at each node according to the example embodiment of the present disclosure are disclosed.

Operations 506 to 508 relate to a method of managing, by the service server, a keyword corresponding to a dead link among the keywords included in the first set of keywords. In operation 506, the service server may check whether each keyword in the first set of keywords corresponds to a dead link based on a landing page of a service corresponding to each keyword in the first set of keywords. In operation 507, when each keyword in the first set of keywords corresponds to the dead link, the service server may update status information of each keyword in the first set of keywords. In operation 508, the service server may provide the updated status information of the first set of keywords to the first server. Operations 506 to 508 correspond to operations 406 to 408, respectively, and detailed descriptions thereof may be omitted.

In operation 509, the service server may update the status information of the keywords in the second set of keywords corresponding to the keyword in the first set of keywords whose status information has been updated based on the updated status information of the first set of keywords. The fact that the keywords in the first set of keywords correspond to the keywords in the second set of keywords may include that the landing page of the service server to which the link exposed as the search result of the keywords in the first set of keywords by the first server is connected corresponds to the landing page of the service server to which the link exposed as the search result of the keywords in the second set of keywords by the second server is connected. The fact that the pages correspond to each other may include that URLs connected to a page are the same or that queries requested from the server to call a page are the same.

For example, like the updated status information of the first set of keywords in operation 507 described above, the service server may update the status information of the keywords in the second set of keywords corresponding to the keywords in the first set of keywords whose status information has been updated. For example, since the keyword "Company A diaper infants" of the first set of keywords corresponds to a dead link, when the status information of "Company A diaper infants" is updated to "off", the status information of the keyword "Company A infants diaper" and "Company A small diaper" of the second set of keywords corresponding to the keyword "Company A diaper infants" of the first set of keywords may be updated to "off" in the same manner. In this way, by updating the status related to the dead link of keywords of the keyword set corresponding to other servers based on the result of performing the dead link check on all the keywords of the keyword set, it is possible to update the status of the keyword corresponding to the dead link efficiently and at low cost without repeatedly performing the dead link check on other keyword sets.

In some example embodiments, the service server may check whether each keyword in a first subset of keywords corresponds to the dead link based on the landing page of the service corresponding to each keyword in the first subset of keywords for the first subset of keywords whose status information has not been updated among the keywords of the second set of keywords, update the status information of the keywords in the first subset of keywords when each keyword in the first subset of keywords corresponds to the dead link, and provide the updated status information of the first subset of keywords to the second server. Since there may be keywords that do not correspond to the keywords of the first set of keywords among the keywords of the second set of keywords and the keywords may not updated based on the updated status information of the first set of keywords, the service server may perform the dead link check on a subset of keywords whose status information in the second set of keywords has not been updated. The service server may completely identify the dead link and the corresponding keyword while maintaining efficiency by performing the dead link check on only a subset that is smaller than that of the second set of keywords.

In operation 510, the service server may provide the updated status information of the second set of keywords to the second server. The service server may update the status information of the second set of keywords corresponding to the dead link and provide the updated status information to the second server, thereby preventing the link to the landing page corresponding to the dead link from being exposed in the second server.

Figure 6:
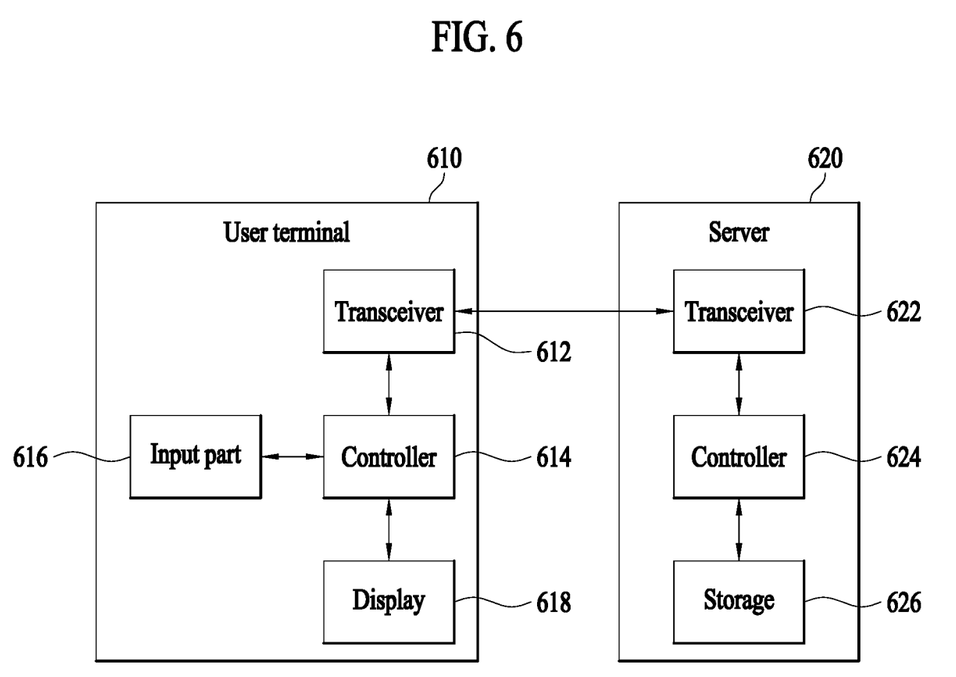
FIG. 6 is a diagram illustrating some components of a link management system related to a keyword advertisement according to an example embodiment of the present disclosure.

FIG. 6 is a diagram illustrating some components of a link management system related to a keyword advertisement according to an example embodiment of the present disclosure.

Referring to FIG. 6, a system for managing a keyword according to the example embodiment of the present disclosure is illustrated, and the system includes a user terminal 610 and a service server 620 which are communicable with each other.

The user terminal 610 may execute an e-commerce client program and may include a transceiver 612, a controller 614, an input part 616, and a display 618.

The transceiver 612 may transmit and receive information to and from other nodes including the server 620.

The input part 616 may receive a user's input and may include a touch screen, a microphone, and a button.

The display 618 may display information related to the operation of the user terminal 610 and may display a page including the information described in the example embodiment.

The controller 614 may control the operation of the user terminal 610 described in the example embodiment to be performed. In addition, the controller 614 may include at least one processor.

In addition, the user terminal 610 may further include a speaker for outputting an event and may further include a storage (not illustrated) that stores at least some pieces of the information transmitted and received through the transceiver 612 and information for the operation of the user terminal 610.

The server 620 is a device on which an electronic commerce server program is executed and may include a transceiver 622, a controller 624, and a storage 626. The transceiver 622 may transmit and receive information to and from other nodes including the user terminal 610.

The controller 624 may control the operation of the server 620 described in the example embodiment to be performed. In addition, the controller 624 may include at least one processor.

In addition, the server 620 may include the storage 626 that stores at least some pieces of information transmitted and received through the transceiver 622 and information for the operation of the server 620.

Meanwhile, the example embodiments of the present disclosure have been disclosed in the present specification and drawings, and although specific terms are used, these are merely used in a general sense to easily describe the technical content of the present disclosure and to aid understanding of the present disclosure but is not intended to limit the scope of the present disclosure. It is obvious to those of ordinary skill in the art to which the present disclosure pertains that other modifications based on the technical idea of the present disclosure can be implemented in addition to the example embodiments disclosed herein.

DESCRIPTION OF THE REFERENCE NUMERALS

110: User terminal
120: Service server
130: Search portal server

What is claimed is:

1. A method of managing a keyword in a service server for providing a service, the method comprising:
   acquiring a first set of keywords corresponding to a first server, wherein the first set of keywords is provided to the first server for keyword advertising;
   checking whether each keyword in the first set of keywords corresponds to a dead link based on a landing page of the service corresponding to each keyword in the first set of keywords;
   when each keyword in the first set of keywords corresponds to the dead link, updating status information of each keyword in the first set of keywords;
   providing the updated status information of the first set of keywords to the first server;
   acquiring a second set of keywords corresponding to a second server, wherein the second set of keywords is provided to the second server for keyword advertising;
   updating status information of a keyword in the second set of keywords corresponding to the keyword in the first set of keywords whose status information has been updated based on the updated status information of the first set of keywords; and providing the updated status information of the second set of keywords to the second server, wherein the first set of keywords is updated by adding a keyword based on a search record of other users acquired from the service.

2. The method of claim 1, wherein an output of a result related to the service is omitted from a search result related to the keyword corresponding to the updated status information related to the first server according to the updated status information provided to the first server.

3. The method of claim 1, further comprising, when a page type corresponding to a specific keyword in the first set of keywords is a page that displays a search result provided by the service, providing the page displaying the search result of the service related to the specific keyword to a user entering the service through a link corresponding to the specific keyword on a page provided by the first server.

4. The method of claim 1, further comprising, when a page type corresponding to a specific keyword in the first set of keywords is a page that displays a search result provided by the service, providing the page displaying the search result of the service related to a related keyword corresponding to the specific keyword to a user entering the service from the first server through a link corresponding to the specific keyword.

5. The method of claim 1, further comprising:

checking whether each keyword in a first subset of keywords corresponds to the dead link based on a landing page of the service corresponding to each keyword in the first subset of keywords whose status information is not updated among the keywords of the second set of keywords;

when each keyword in the first subset of keywords corresponds to the dead link, updating the status information of each keyword in the first subset of keywords; and providing the updated state information of the first subset of keywords to the second server.

6. The method of claim 1, wherein the checking of whether each keyword in the first set of keywords corresponds to the dead link comprises checking whether a keyword selected from the first set of keywords corresponds to the dead link based on a search record of other users acquired from the service.

7. The method of claim 1, wherein the checking of whether each keyword in the first set of keywords corresponds to the dead link comprises checking whether a keyword selected from the first set of keywords corresponds to the dead link based on page information provided to other users entering the service from a search result of the first server.

8. The method of claim 1, wherein the updating of the status information of the keyword in the second set of keywords comprises, when there exists the keyword in the first set of keywords corresponding to the keyword in the second set of keywords and the landing page of the service corresponding to the keyword in the second set of keywords corresponds to the landing page of the service corresponding to the keyword in the first set of keywords, updating the status information of the keyword in the second set of keywords on the basis of the status information of the keyword in the first set of keywords.

9. The method of claim 1, wherein the landing page includes one of a page displaying a search result of the service server and a page displaying detailed information of a product selected from the search result, and the method further comprises, when a first keyword in the first set of keywords corresponds to the dead link and the landing page of the service corresponding to the first keyword is the page displaying the search result, updating status information of the first keyword and a second keyword which is related to the page displaying the detailed information of the product included in the search result.

10. The method of claim 9, further comprising, when the first keyword in the first set of keywords corresponds to the dead link and the landing page of the service corresponding to the first keyword is the page displaying the search result, updating the landing page of the service corresponding to the first keyword to a landing page related to a replacement keyword of the first keyword.

11. The method of claim 6, wherein the checking of whether each keyword in the first set of keywords corresponds to the dead link further comprises assigning a priority to a keyword satisfying a specific condition in the search record, and a cycle of checking whether the keyword to which the priority is assigned corresponds to the dead link is shorter than a cycle of checking whether the keyword to which the priority is not assigned corresponds to the dead link.

12. The method of claim 11, wherein the specific condition comprises a condition that a search frequency for the keyword in the search record is greater than or equal to a threshold value for a predetermined period of time.

13. A device for providing a service, the device comprising:

a transceiver configured to exchange information with a remote server;

a processor; and a memory comprising instructions that, when executed by the processor, control the device to:

acquire a first set of keywords corresponding to a first server, wherein the first set of keywords is provided to the first server for keyword advertising;

check whether each keyword in the first set of keywords corresponds to a dead link based on a landing page of the service corresponding to each keyword in the first set of keywords;

update status information of each keyword in the first set of keywords when each keyword in the first set of keywords corresponds to the dead link;

provide the updated status information of the first set of keywords to the first server;

acquire a second set of keywords corresponding to a second server, wherein the second set of keywords is provided to the second server for keyword advertising;

update status information of a keyword in the second set of keywords corresponding to the keyword in the first set of keywords whose status information has been updated based on the updated status information of the first set of keywords; and provide the updated status information of the second set of keywords to the second server, wherein the first set of keywords is updated by adding a keyword based on a search record of other users acquired from the service.

14. A non-transitory computer-readable storage medium comprising a medium configured to store computer-readable instructions, wherein when the computer-readable instructions are executed by a processor, the processor is configured to perform a method of managing a keyword in a service server providing a service, the method comprising:

acquiring a first set of keywords corresponding to a first server, wherein the first set of keywords is provided to the first server for keyword advertising;

checking whether each keyword in the first set of keywords corresponds to a dead link based on a landing page of the service corresponding to each keyword in the first set of keywords;

when each keyword in the first set of keywords corresponds to the dead link, updating state information of each keyword in the first set of keywords;

providing the updated status information of the first set of keywords to the first server;

acquiring a second set of keywords corresponding to a second server, wherein the second set of keywords is provided to the second server for keyword advertising;

updating status information of a keyword in the second set of keywords corresponding to the keyword in the first set of keywords whose status information has been updated based on the updated status information of the first set of keywords; and providing the updated status information of the second set of keywords to the second server, wherein the first set of keywords is updated by adding a keyword based on a search record of other users acquired from the service.

\* \* \* \* \*